(12) United States Patent
Montgomery

(10) Patent No.: US 8,739,380 B1
(45) Date of Patent: Jun. 3, 2014

(54) METHOD OF MAKING A MULTI-LEVEL SWING OUT COOKER/SMOKER

(76) Inventor: Robert B. Montgomery, Gulfport, MS (US)

(*) Notice: Subject to any disclaimer, the term of this patent is extended or adjusted under 35 U.S.C. 154(b) by 347 days.

(21) Appl. No.: 13/340,212

(22) Filed: Dec. 29, 2011

Related U.S. Application Data

(63) Continuation-in-part of application No. 12/931,087, filed on Jan. 25, 2011, now abandoned.

(51) Int. Cl.
A47J 27/00 (2006.01)
B21K 21/16 (2006.01)
B23P 17/04 (2006.01)
B23P 23/00 (2006.01)

(52) U.S. Cl.
USPC .......... 29/401.1; 29/412; 29/415; 29/416; 29/433; 29/434; 126/25 A; 126/25 R; 126/9 R; 126/38; 99/482; 99/449

(58) Field of Classification Search
USPC ........ 29/412, 417, 433, 434, 467, 469, 401.1, 29/415, 416; 126/25 S, 25 R, 9 R, 38; 99/482, 449, 450
See application file for complete search history.

(56) References Cited

U.S. PATENT DOCUMENTS

| 1,477,844 | A | * | 12/1923 | Nystrom | 126/39 C |
| D237,856 | S | * | 12/1975 | Madson et al. | D7/332 |
| 4,020,322 | A | * | 4/1977 | Muse | 219/392 |
| 4,094,295 | A | | 6/1978 | Boswell et al. | |
| D259,693 | S | * | 6/1981 | Ottmar | D7/336 |
| 4,512,249 | A | | 4/1985 | Mentzel | |
| 4,924,071 | A | * | 5/1990 | Jacobs | 219/400 |
| 4,957,039 | A | | 9/1990 | Reyes | |
| 5,184,599 | A | * | 2/1993 | Stuart | 126/25 R |
| 5,216,947 | A | * | 6/1993 | Cheng | 99/417 |
| 5,222,475 | A | * | 6/1993 | Greener | 126/41 R |
| 5,359,923 | A | | 11/1994 | Boswell | |
| 5,473,979 | A | * | 12/1995 | Ruben | 99/446 |
| 5,564,330 | A | | 10/1996 | Nowicke, Sr. | |
| 5,768,977 | A | * | 6/1998 | Parris et al. | 99/340 |
| 6,016,797 | A | | 1/2000 | Nowicke, Jr. | |
| 6,543,435 | B1 | | 4/2003 | Regen et al. | |
| D624,350 | S | | 9/2010 | Wu | |
| 7,861,705 | B2 | * | 1/2011 | Hulsey | 126/25 A |
| 2009/0199839 | A1 | | 8/2009 | Hulsey | |

* cited by examiner

Primary Examiner — David Bryant
Assistant Examiner — Jason L. Vaughan
(74) Attorney, Agent, or Firm — George L Williamson

(57) ABSTRACT

Method and apparatus for a swing-out, multi-level barbeque smoker having a common mounting post wherein the individual cooking units are mounted on the common mounting post so that the individual units are slidably and swingably disposed so that a user can have easy access to the individual units. The apparatus is mounted on a wheeled carriage having a handle bar assembly so that the wheeled carriage can be easily maneuvered by a user. The upper swing-out unit has a grill for receiving food items, the middle swing-out unit has a bowl for receiving water therein and the lower unit has a grill upon which the fuel, e.g., charcoal or the like can be placed.

6 Claims, 4 Drawing Sheets

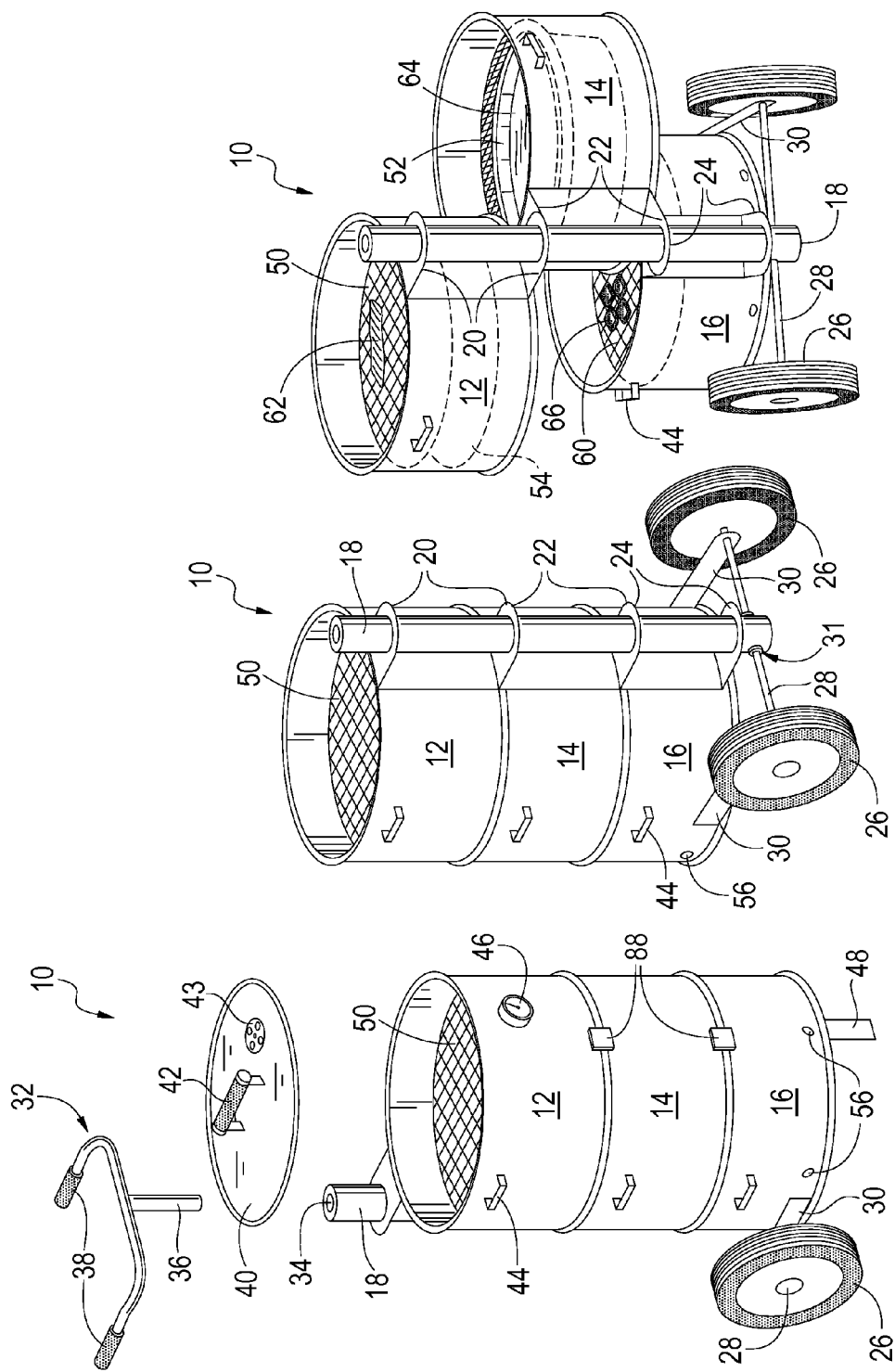

METHOD OF MAKING A MULTI-LEVEL SWING OUT COOKER/SMOKER

RELATED APPLICATIONS

This application is a Continuation-in-Part of U.S. patent application Ser. No. 12/931,087 filed on Jan. 25, 2011 now abandoned.

BACKGROUND OF THE INVENTION

1. Field of the Invention

The present invention relates generally to cooking grills, and, more particularly, is concerned with a barbeque grill or smoker having sliding, swing-out, multiple cooking levels.

2. Description of the Related Art

Cooking grills have been described in the related art, however, none of the related art devices disclose the unique features of the present invention.

In U.S. Pat. No. 4,957,039 dated Sep. 18, 1990 Reyes disclosed a five-in-one cooker. In U.S. Pat. No. 5,359,923 dated Nov. 1, 1994, Boswell disclosed a smoker and cooker with improved adjustable spaced grill support. In U.S. Pat. No. 4,512,249 dated Apr. 23, 1985 Mentzel disclosed a smoker adapter for kettle grills. In U.S. Pat. No. 6,016,797 dated Jan. 25, 2000 Nowicke, Jr., disclosed a barbeque grill with smoker and water pan conversion. In U.S. Pat. No. 4,094,295 dated Jun. 13, 1978 Boswell, et al., disclosed a charcoal and water smoker and cooker. In U.S. Pat. No. 6,543,435 dated Apr. 8, 2003 Regen, et al., disclosed a collapsible, multi-level barbeque grill oven and smoker system. In U.S. Pat. No. 5,564,330 dated Apr. 15, 1996, Nowicke, Sr., disclosed a grill cooker and smoker combination. While these cooking grills may be suitable for the purposes for which they were designed, they would not be as suitable for the purposes of the present invention as hereinafter described.

SUMMARY OF THE PRESENT INVENTION

The present invention discloses a method and apparatus for a swing-out, multi-level barbeque smoker having a common mounting post wherein the individual cooking units are mounted on the common mounting post so that the individual units are slidably and swingably disposed so that a user can have easy access to the individual units and so that the individual units can be slidably removed from the mounting post for cleaning and then reassembled for use. The present invention is mounted on a wheeled carriage having a handle bar assembly so that the wheeled carriage can be easily maneuvered by a user. The upper swing-out unit has a grill for receiving food items, the middle swing-out unit has a bowl for receiving water therein and the lower unit has a grill upon which the fuel, e.g., charcoal or the like can be placed.

An object of the present invention is to provide a barbeque smoker having swing-out cooking units so that a user can more easily access the individual cooking units. A further object of the present invention is to provide a swing-out, multi-level barbeque smoker having individual units slidably mounted on a common post so that the individual units can be easily removed for cleaning and then reattached for use. A further object of the present invention is to provide a barbeque smoker which can be wheeled about by a user so that it can be easily maneuvered. A further object of the present invention is to provide a barbeque smoker which has more utility than a regular barbeque smoker so that a user can use the present invention for a broader array of cooking purposes. A further object of the present invention is to provide a barbeque smoker which can be easily used by the user. A further object of the present invention is to provide a barbeque smoker which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a front perspective of the present invention.

FIG. 2 is a rear perspective of the present invention.

FIG. 3 is a rear perspective of the present invention.

LIST OF REFERENCE NUMERALS

Figure 4:
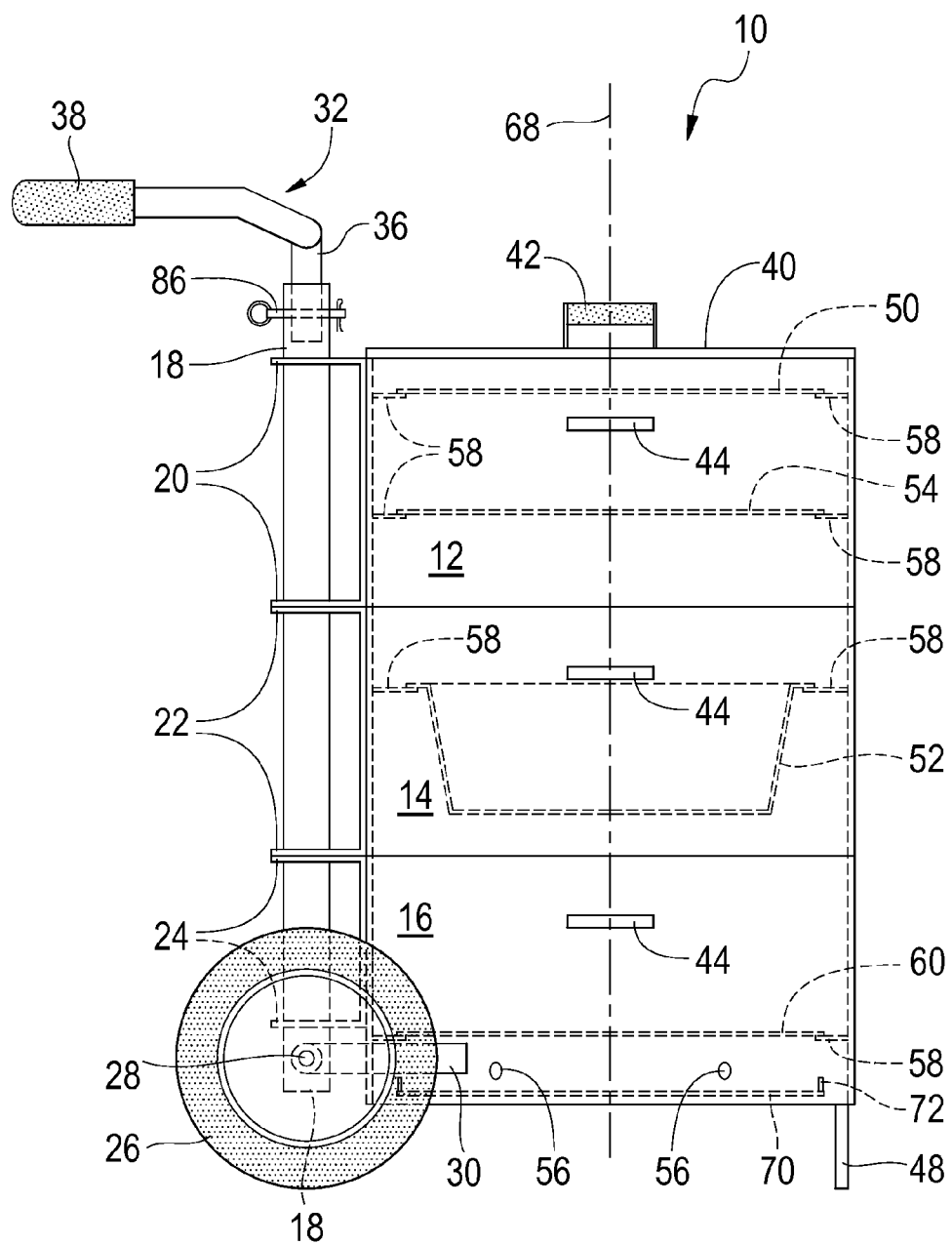
FIG. 4 is a cross sectional side view of the present invention.

With regard to reference numerals used, the following numbering is used throughout the drawings.

| | |
|---|---|
| 10 | present invention |
| 12 | upper food section |
| 14 | middle water section |
| 16 | lower fuel section |
| 18 | mounting post |
| 20 | rotatable mounting bracket |
| 22 | rotatable mounting bracket |
| 24 | fixed mounting bracket |
| 26 | wheels |
| 28 | axle |
| 30 | mounting brace |
| 31 | attachment point to post |
| 32 | handlebar assembly |
| 34 | aperture |
| 36 | mounting arm |
| 38 | handles |
| 40 | top |
| 42 | handle |
| 43 | air vent |
| 44 | handle |
| 46 | thermometer |
| 48 | support leg |
| 50 | upper food grate/grill |
| 52 | water bowl |
| 54 | lower food grate/grill |
| 56 | air inlets |
| 58 | mounting flange |
| 60 | fuel grate/grill |
| 62 | food item |
| 64 | water |

-continued

| 66 | fuel |
| 68 | central axis |
| 70 | pan |
| 72 | handle of pan |
| 74 | arrow |
| 76 | conventional drum |
| 78 | top |
| 80 | upper section |
| 82 | middle section |
| 84 | lower section |
| 86 | lock pin assembly |
| 88 | latch assembly |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a swing-out, multi-level barbeque smoker grill is disclosed.

Turning to FIGS. 1 through 4, therein is shown the present invention 10 having an upper food section or unit 12, the middle water section or unit 14 and a lower fuel section or unit 16 rotatably disposed on a common mounting post 18 using a first rotatable mounting bracket 20, and a second rotating mounting bracket 22. The lower fuel section or unit is fixedly mounted using bracket 24 as it is unnecessary for it to swing out for a user to easily access it. Also shown is a wheeled assembly comprising a pair of wheels 26 mounted on axle 28 together comprising an axle assembly which is attached to the lower fuel section or unit 16 using braces 30 and attached to the lower end of the mounting post 18 at 31. Also shown is an upper handlebar assembly 32 mounted into an aperture 34 on the upper end portion of the mounting post 18 by means of a mounting arm 36 which extends downwardly from the handlebar assembly 32 so that the arm can be inserted into the aperture 34 of the mounting post 18. A pair of handles 38 are disposed on the handlebar assembly 32 so that the present invention can be easily wheeled about and maneuvered by a user. Also shown is a removable top 40 for covering the upper food section or unit 12, the top having a handle 42 thereon and at least one air vent therein 43 for controlling air flow through the present invention 10. Each of the sections or units, 12, 14 and 16 have a pair of handles 44 thereon on opposite sides so that a user can pick them up and move them about using the handles along with a thermometer 46 being mounted on the present invention 10 in order to observe and control the cooking temperature. Also shown is a ground contacting support leg 48 mounted on a lower end portion of the present invention 10. Also shown is an upper food grate/grill 50 showing exemplary food items 62 thereon, e.g. spare ribs or hamburger patties, a lower food grate/grill 54, a water bowl 52 having water 64 therein to provide a moisture rich environment within which to cook the food item, and a fuel grate/grill 60 having an exemplary fuel source 66 thereon, e.g., charcoal briquettes, each grate/grill having means for mounting, e.g., an inwardly disposed rim or flange 58, in the individual sections or units, 12, 14 and 16. Also shown are a pair of air inlets 56 mounted on the side of the lower end portion of the present invention 10 to allow air to enter into the present invention while air can pass out the upper end portion by means of air vent 43 or through the open or uncovered upper end of the first food section 12. Also shown in FIG. 4, is a round, flat pan 70 with a pair of handles 72 thereon disposed at the bottom of the fuel compartment 16 for catching ashes so that the pan and the ashes can be easily removed from the present invention 10.

Figure 5:
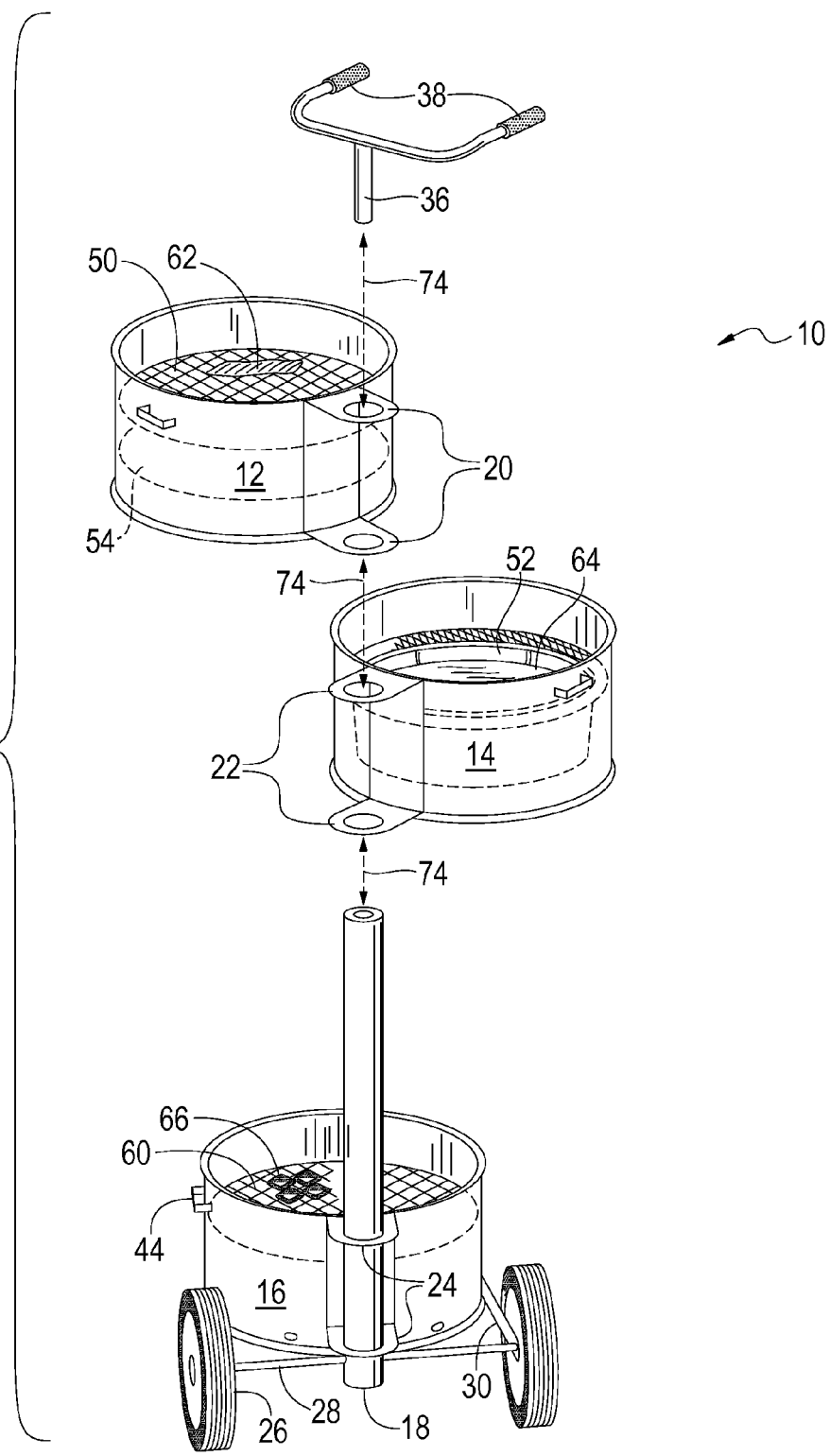
FIG. 5 is an exploded rear perspective of the present invention.
Figures 6A, 6B:
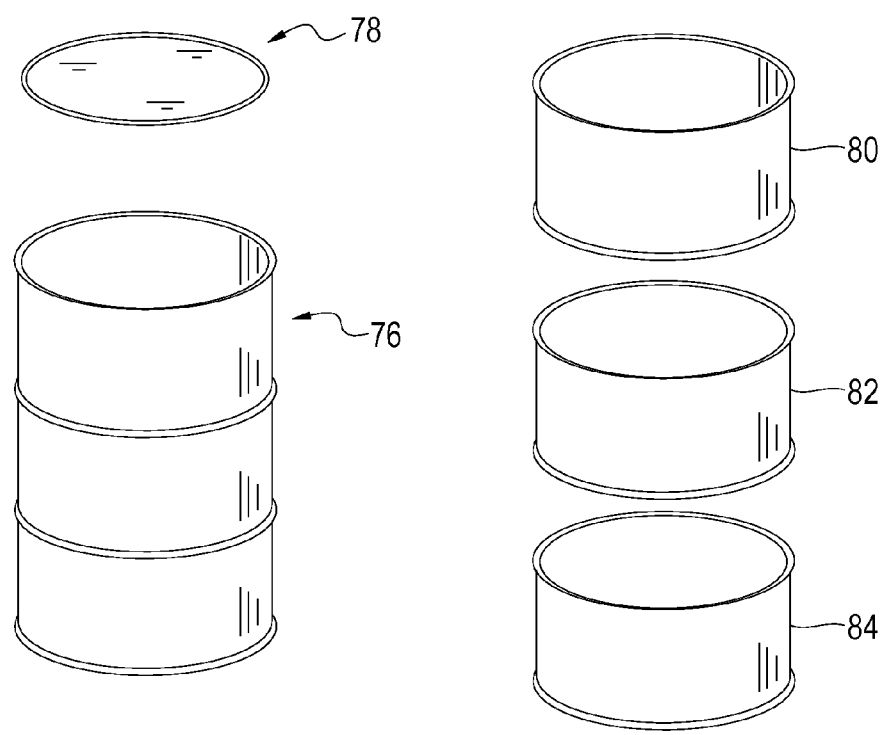
FIGS. 6A and 6B illustrate certain steps for making the present invention.

Turning to FIG. 5, therein is shown the present invention 10 wherein certain individual members are shown being removable from the mounting post 18 by being slidable up or down the post as indicated by arrows 74 so as to be removed from or replaced on the mounting post so that the removable members can be removed/disassembled, cleaned or washed off and then replaced/reassembled in no more than fifteen to twenty minutes. The removable members are the handles 38, the upper food section 12, and the middle water section 14; the lower fuel section 16 is not removable.

The method of using the present invention 10 can be summarized as follows: A method for cooking a food item, comprising the steps of, providing a cooker 10, wherein the cooker comprises an upright standing housing 10 generally having an upper end portion and a lower end portion; wherein the housing comprises a first 12, second 14 and third 16 sections wherein each section has upper and lower end portions, wherein the first section is disposed contiguous to the upper end portion of the housing, wherein the third section is disposed contiguous to the lower end portion of the housing, wherein the second section is disposed between the first and third section of the housing, wherein each of the first, second and third sections has a central axis 68, wherein the housing can be configured so the central axis of each first, second and third sections are aligned (see FIG. 4) to permit fuel 66 placed in the third section to heat the first and second sections when the fuel is ignited for cooking the food item 62; providing a mounting post 18 having upper and lower end portions, the mounting post being upright standing, wherein the mounting post extends substantially from the upper end portion of the housing to the lower end portion of the housing, wherein each of the first, second and third sections are disposed on the mounting post; wherein each of the first and second sections are pivotally disposed at 20, 22 on the mounting post, wherein each of the first and second sections pivot about the mounting post in substantially a horizontal plane (see FIG. 3) to permit a user to access the first, second and third sections; and, providing at least one grill 50 being disposed in each of the first and third sections, wherein the grill of the first section is for receiving food items and the grill of the third section is for receiving fuel, providing a water bowl 52 for containing water being disposed in the second section to permit the food item to be cooked in a moisture rich environment. Further comprising the step of providing a ground contacting wheel 26 disposed on the lower end portion of the cooker, wherein the cooker can be wheeled about from a first location to a second location. Further comprising the step of providing a top 40 for placement on the upper end portion of the first section. Further comprising the step of providing at least one handle 38 being disposed on the upper end portion of the mounting post so that a hand of a user can grasp the handle so that the cooker can be maneuvered by a user as the cooker is being wheeled about. Further comprising the steps of providing at least one air inlet 56 disposed proximate the lower end portion of the cooker and at least one air outlet 43 or open end of first section 12 disposed proximate the upper end portion of the cooker so that air can flow through the housing. Further comprising the step of providing at least one handle 44 being disposed on each first, second and third sections so that a hand of a user can grasp the handle.

Traditionally, 55 gallon drums have been used for making one-piece smokers or grills for several decades. These type drums have generally suitable dimensions for this purpose as they have the correct height and diameter and are made of sturdy material. These drums have nominal dimensions of 33 inches in height, 23 inches in diameter and are constructed of 18 gauge steel. They are also inexpensive to purchase and the 23 inch diameter will allow many commercially produced grates to fit into it.

Used drums are usually selected for this purpose. However, one should be careful to determine what was stored in these drums as food will be prepared in them. Drums that have had petroleum products stored in them are not a good choice. Drums that have had food products stored in them (such as sugar, flour, etc.) are good choices. Regardless of what has been stored in them, a hot fire of wood or charcoal should be built in them to burn out the inside prior to using them as a smoker.

The old homemade drum smokers usually consisted of one piece (the whole drum) with a grate at the bottom to hold charcoal and a grate at the top to hold the food with a top to cover it. Sometimes holes or vents were cut into the side in an effort to control air and heat. While in the process of smoking, temperatures are hard to control and access to the charcoal is difficult because of the depth of the drum. To add charcoal (which often happens), you would have to remove the food and add the charcoal. The temperature goes down in this process and it prolongs the cooking time. Also, it would be difficult to install a water bowl to add moisture to the food. This type of smoker is not mobile and would be hard to move from one spot to another. It would also be cumbersome to clean and maintain.

In an effort to eliminate some of the inherent problems of a one piece smoker, i.e. temperature control, adding moisture to the food, mobility and maintenance, the present invention 10 was designed being a unique approximate 55 gallon drum smoker with new features.

The method of making the present invention 10 follows and makes reference to FIGS. 1-6. First of all, the drum 76 as shown in FIG. 6A needs to be cut transversally into three equal parts as shown in FIG. 6B which would yield each piece being nominally 11 inches in height and the original top 78 removed and discarded. The upper portion 80 would be used for the food compartment 12 of the present invention 10, the middle portion 82 would be used for the water bowl section 14 of the present invention 10 to provide moisture, and the bottom portion 84 would be used for section 16 of the present invention 10 to hold the fuel 66 (charcoal usually).

The food compartment 12 would be prepped for two grates 50, 54 by adding supports 58 around its circumference. Two commercially produced grates 50, 54 (or homemade ones if preferred) would then sit on these supports 58. A commercial grade thermometer 46 with a range of 50 to 550 degrees F. would then be attached to this compartment 12. Handle's 44 are also attached.

The water bowl compartment 14 would be prepped by adding supports 58 around its circumference. A piece of expanded metal with a hole cut in it would sit on these supports. A steel 12 qt. water bowl 52 with a diameter of 16 inches would then fit into the hole in the expanded metal. The 16 inch dimension is critical as this would allow for this compartment 14 to have 50% of the heat coming through the expanded metal and 50% of the moisture coming from the water bowl. Handles 44 are also attached.

The bottom fuel compartment 16 would be prepped by adding supports 58 around the circumference. A full size diameter piece 60 of expanded metal would be placed on these supports to hold the charcoal 66. Four controllable one inch air vents 56 would be drilled into the side at the quarter points. A removable full size metal pan 70 with handles 72 would be placed below the fuel grate to catch the ashes during smoking.

The lid 40 for the smoker 10 would be flat or dome shaped and constructed out of 16 gauge steel with a diameter equal to the diameter of the drum 76. It would have a heat proof handle 42 and have four controllable one inch air vents 43 drilled into it. Both top and bottom sets of air vents 43, 56 can be used to control cooking temperature.

Once all of the compartments 12, 14, 16 have been individually prepped and ready for assembly, the problem now becomes how to make them compatible with each other, make the smoker mobile, and make it easy to maintain and clean. These three compartments 12, 14, 16 need to fit on top of each other just like they were in the original drum 76.

The solution to this is to have them fit over a central mounting post 18 via a bracket 20, 22, 24 welded or bolted to each compartment. A 2⅜ inch post 18 was selected. A U-shaped bracket 20, 22, 24 made of 16 gauge steel was fabricated and attached in the longitudinal plane to each compartment 12, 14, 16 so that each bracket had a hole in it top and bottom that would fit over the post.

To make the entire assembly stable and to be mobile, the bottom fuel compartment 16 was permanently fixed to the post 18. This was accomplished by drilling and installing through the post 18 a ⅝ inch axle 28 permanently attached. Two twelve inch diameter tires 26 were then attached to the axle 28. Two brackets 30 were then permanently installed from the axle 28 to the fuel compartment 16 and a front leg 48 was then attached to the fuel compartment to make the whole assembly level. This assembly consisting of the central post 18, wheels 26 and axle 28, and the bottom fuel compartment 16 provided the base of the smoker 10 on top of which the other two compartments 12, 14 (food and water) would fit.

The food 12 and water 14 compartments with their U-shaped brackets 20, 22 attached would easily fit over the central post 18 and once they were slid over the post, they could easily be rotated left or right for access to food 62, water 64 and charcoal 66 and once smoking was completed, the food and water compartments could be removed for easy cleaning. This would also create easy access to the fuel compartment 16 where the ash pan 70 could be removed and the compartment cleaned.

To provide mobility for the present invention 10, a set of handle bars 32 for being grasped by the hands of a user were inserted into the top of the central post 18. These handle bars 32 were attached to the post 18 by a removable conventional hitch or lock pin assembly 86, as shown in FIG. 4, so they could be removed for cleaning and then reattached for mobility. Lock pin assembly 86 comprises a pin having a ring on one end and a cotter pin or the like on the other end which is removably disposed in and passes through mating holes in the handle bar assembly 36 and the mounting post 18 so that the handle bar and post can be joined together when the pin is in one position or separated from each other when the pin is in a second position.

While the smoker 10 is being moved using the handle bars 32, each compartment 12, 14, 16 needs to be temporarily connected to each other to keep them from shifting from side to side and becoming unstable. This can be accomplished by placing a latch assembly 88 or the like, as shown in FIG. 1, on each compartment 12, 14, 16 so that they can be joined together when the latch is in one position or separated from each other when the latch is in a second position.

I claim:

1. A method of making a cooker for cooking a food item, comprising the steps of:

a) providing a drum;

b) cutting the drum into first, second and third equally sized sections;

c) providing an upright standing housing by disposing the first, second and third sections on top of each other thereby forming the upright standing housing generally having upper and lower end portions;

d) wherein the housing comprises the first, second and third sections wherein each section has upper and lower end portions, wherein the first section is disposed contiguous to the upper end portion of the housing, wherein tile third section is disposed contiguous to the lower end portion of the housing, wherein the second section is disposed between the first and third section of the housing, wherein each of the first, second and third sections has a central axis, wherein the housing is configured so that the central axis of each first, second and third sections are aligned to permit fuel placed in the third section to heat the first and second sections when the fuel is ignited for cooking the food item;

e) providing a mounting post having upper and lower end portions, the mounting post being upright standing, wherein the mounting post extends substantially from the upper end portion of the housing to the lower end portion of the housing, wherein each of the first, second and third sections are disposed on the mounting post;

f) wherein each of the first and second sections are pivotally disposed on the mounting post, wherein each of the first and second sections pivot about the mounting post in substantially a horizontal plane to permit a user to access the first, second and third sections;

g) wherein each of the first and second sections slide up or down the mounting post so that a user can remove the first and second sections from the mounting post; and, h) providing at least one grill being disposed in each of the first and third sections, wherein the grill of the first section is for receiving food items and the grill of the third section is for receiving fuel, providing a water bowl for containing water being disposed in the second section to permit the food item to be cooked in a moisture rich environment.

2. The method of claim 1, further comprising the step of providing a ground contacting wheel disposed on the lower end portion of the cooker, wherein the cooker can be wheeled about from a first location to a second location.

3. The method of claim 1, further comprising the step of providing a top for placement on the upper end portion of the first section.

4. The method of claim 1, further comprising the step of providing at least one handle being disposed on the upper end portion of the mounting post so that a hand of a user can grasp the handle so that the cooker can be maneuvered by a user as the cooker is being wheeled about.

5. The method of claim 1, further comprising the steps of providing at least one air inlet disposed proximate the lower end portion of the cooker and at least one air outlet disposed proximate the upper end portion of the cooker so that air can flow through the housing.

6. The method of claim 1, further comprising the step of providing at least one handle being disposed on each first, second and third sections so that a hand of a user can grasp the handle.

* * * * *